United States Patent [19]

Cheung et al.

[11] Patent Number: 6,072,799
[45] Date of Patent: Jun. 6, 2000

[54] SCALABLE ATM SIGNALING MESSAGE PROCESSING BASED ON PER SESSION DISPATCH

[75] Inventors: Chung Lap Cheung, Kanata; Ming Cheong Leung, Nepean; Kadir Ozdemir, Ottawa; Amr G Sabaa, Nepean, all of Canada

[73] Assignee: Nortel Networks Corporation, Montreal, Canada

[21] Appl. No.: 08/997,775

[22] Filed: Dec. 24, 1997

[51] Int. Cl.[7] .................................................. H04L 12/28
[52] U.S. Cl. ............................................. 370/395; 370/426
[58] Field of Search .................................. 370/375, 376, 370/388, 389, 395, 410, 412, 419, 422, 426; 395/800

[56] References Cited

U.S. PATENT DOCUMENTS

| | | | |
|---|---|---|---|
| 5,519,690 | 5/1996 | Suzuka et al. | 370/395 |
| 5,802,052 | 9/1998 | Venkataraman | 370/395 |
| 5,832,287 | 11/1998 | Atalla | 395/800 |

*Primary Examiner*—Huy D. Vu
*Assistant Examiner*—Alexander Boakye

[57] ABSTRACT

A new method of processing Asynchronous Transfer Mode (ATM) signaling messages is described wherein a plurality of computing units (CUs), each running signaling processing software, collectively provide signaling processing services for all the ports of a switch. As more ports, and more cards, are added to a switch, CUs can be incrementally added to support additional traffic. More significantly, in order to optimize the utilization rates of the plurality of CUs, the method provides for dynamic load-sharing of signaling traffic between CUs, such that a CU is allocated not on a per port basis, but on a per switched virtual circuit (SVC) session basis.

24 Claims, 3 Drawing Sheets

SCALABLE ATM SIGNALING MESSAGE PROCESSING BASED ON PER SESSION DISPATCH

FIELD OF THE INVENTION

This invention relates to broadband communication switches, and more specifically to a new method of processing control messages sent to broadband communication switches.

BACKGROUND OF THE INVENTION

Connection oriented services require establishment of a connection between the origin and destination before transferring data. Usually, the connection is established as a path of links through intermediate nodes in a network. When the connection is established, maintained and taken down using inband control signaling, then it is called a Switched Virtual Circuit (SVC). The creation, maintenance and eventually release of a connection between two end-points in a network, is referred to as an SVC session.

The nodes of a network that participate in an SVC session must share a control signaling protocol. In the Asynchronous Transfer Mode (ATM) suite of protocols, that control signaling protocol is ITU-T Recommendation Q.2931. The signaling protocol specifies several vital aspects of an SVC session, including the call-reference identifier (ID) of the session, the sequence of messages that must be exchanged, the rules for verifying consistency of the parameters in the message, and the actions to be taken in order to establish and release SVCs.

Implementing a signaling protocol involves each node receiving and processing signaling messages sent by other nodes. This function is achieved on many ATM nodes by placing, on each card that has one or more ports, a high-performance embedded computing system. Each card's computing system processes only control signaling messages that originate from ports located on the same card. This one-processor-per-card architecture can allow the switch to rapidly process signaling information since each card is given its own processor. It also allows for the signaling processing capacity to vary from node to node according to the number of ports and the link-speed of each port being supported on each node.

The same architecture suffers from several drawbacks however, including the high costs of providing a computing system for each card on the node, of coordinating a plurality of computing systems on one node, and of upgrading the signaling processing capacity in response to technological advances in computing technology.

This one-processor-per-card architecture also suffers from the inability to distribute signaling processing loads evenly amongst all the computing systems on each node. This is because signaling information going into a given card can only be processed by the embedded computing system that is serving that card. Under-utilization of the node's computing systems results whenever the demand for signaling processing is not at maximum-supported levels for each card.

Additionally, the one-processor-per-card architecture is not very fault-tolerant, since it is economically unfeasible to maintain redundant computing systems for every card on a switch. Should a card's computing system fail, the usual result is the inability of any of the ports attached to that card to process signaling messages.

In light of the foregoing drawbacks, some nodes use another architecture that calls for a single computing system to process signaling messages flowing through all the cards of a node. This architecture requires splitting the node into two parts—a switching element (SE) and a computing unit (CU). Generally, an SE is an ATM switching platform with many cards that interconnects various ATM links to each other. A CU is a computing platform that implements software control functions for all hardware components on the SE. These software control functions include signaling, in addition to other functions such as operations, administration and maintenance (OA&M). The CU is connected to its associated SE through a dedicated high-speed link, such as an ATM link or Ethernet link.

From a signaling perspective, the SE contains all the cards and ports where signaling messages enter and leave the node. The CU processes all the signaling information for all the ports and cards of the SE. Hardware on the SE relays signaling messages to and from the CU.

Under this architecture, cards on the SE do not need to have embedded computing systems for signaling purposes. They only need to be able to deliver the signaling messages to the CU. The CU processes these messages and then instructs the SE as to what actions to take, or relays signaling messages destined for other nodes back through the SE for transmission across network links.

Unlike the one-processor-per-card architecture, this one-processor-per-node architecture results in lower computer processing costs, and higher computer utilization rates. If a stand-by CU is maintained, this architecture also exhibits increased fault-tolerance relative to the one-signaling-processor-per-port architecture.

Even this one-processor-per-node architecture suffers from significant drawbacks however, including a lack of support for a scalable signaling processing capacity. As more cards are added or as the signaling traffic through existing cards increases, there is no graceful way to grow the single processor computing system on the CU to accommodate this increased demand without suffering through expensive upgrades of the CU.

To function effectively, a signaling protocol relies on the proper operation of several known underlying protocols, including physical layer protocols, ATM layer protocols, the Common Part ATM Adaptation Layer (CP-AAL) protocols, and Signaling ATM Adaptation Layer (SAAL) protocols. The SAAL protocols are particular to signaling applications, and include the Service Specific Coordination Function (SSCF) and the Service Specific Connection-Oriented Protocol (SSCOP). The SSCF provides many services to the software that implements the signaling protocol (e.g. the Q.2931 protocol) including independence from the underlying protocols, unacknowledged data transfer mode, and assured data transfer mode. The SSCOP, in turn, provides many services to the software that implements the SSCF protocol such as ordered delivery, error correction and receiver-based flow control.

SUMMARY OF THE INVENTION

In light of the foregoing problems, nodes require a new method of processing ATM signaling messages, that is relatively faster, more scalable, less expensive, more flexible and more fault-tolerant.

These and other objects are achieved by a new method of signaling processing wherein a plurality of CUs, each running signaling processing software, collectively provide signaling processing services for all the cards of a switch. As more ports, and more cards, are added to a switch, CUs can be incrementally added to the node to support additional traffic.

More significantly, in order to optimize the utilization rates of the plurality of CUs, the method provides for dynamic load-sharing of signaling traffic between CUs, such that a CU is allocated not on a per port basis, but on a per SVC-session basis.

The above-mentioned objects are achieved, in an Asynchronous Transfer Mode (ATM) node comprised of a switch element (SE) for switching traffic between ATM links and a plurality of computing units (CUs) connected to the SE for performing software control functions, by a method of processing an ATM signaling message that is associated with a given Switched Virtual Circuit (SVC) session and conforms with a given signaling protocol, said method comprising the steps of: a port on the SE receiving the signaling message from ATM links; a message header processing means receiving the signaling message and stripping it of headers used by protocols other than the signaling protocol; an ATM signal session dispatch logic (ASSDL) selecting one of the CUs to process the message on a per-SVC session basis; the ASSDL forwarding the message to the selected CU for processing; and the selected CU processing the message and sending any necessary signaling messages in response out over a network link through the ASSDL and the SE.

Another aspect of this invention achieves the abovementioned objects through an Asynchronous Transfer Mode (ATM) node comprising a switch element (SE) containing ports and a switching fabric for switching traffic between ATM links, a plurality of computing units (CUs) for performing software control functions that is connected to the SE through ATM links, and means for dispatching signaling messages to the CUs such that the signaling messages are processed on the CUs.

Another aspect of this invention achieves the abovementioned objects through an Asynchronous Transfer Mode (ATM) switch element (SE) containing ports and a switching fabric for switching traffic between ATM links, and means for dispatching signaling messages to computing units (CUs) such that the signaling messages are processed on the CUs.

Another aspect of this invention achieves the abovementioned objects through a card for dispatching signaling messages from an ATM switching element to computing units (CUs) such that the signaling messages are processed on the CUs, said card comprising means for implementing the services associated with the Service Specific Coordination Function (SSCF) and the Service Specific Connection-Oriented Protocol (SSCOP), and an ATM signaling session dispatch logic (ASSDL) for dispatching Q.2391 PDUs to the CUs.

BRIEF DESCRIPTION OF THE DRAWINGS

Embodiments of the invention will now be disclosed with reference to the accompanying drawings, in which.

DETAILED DESCRIPTION OF THE PREFERRED EMBODIMENTS

Figure 1:
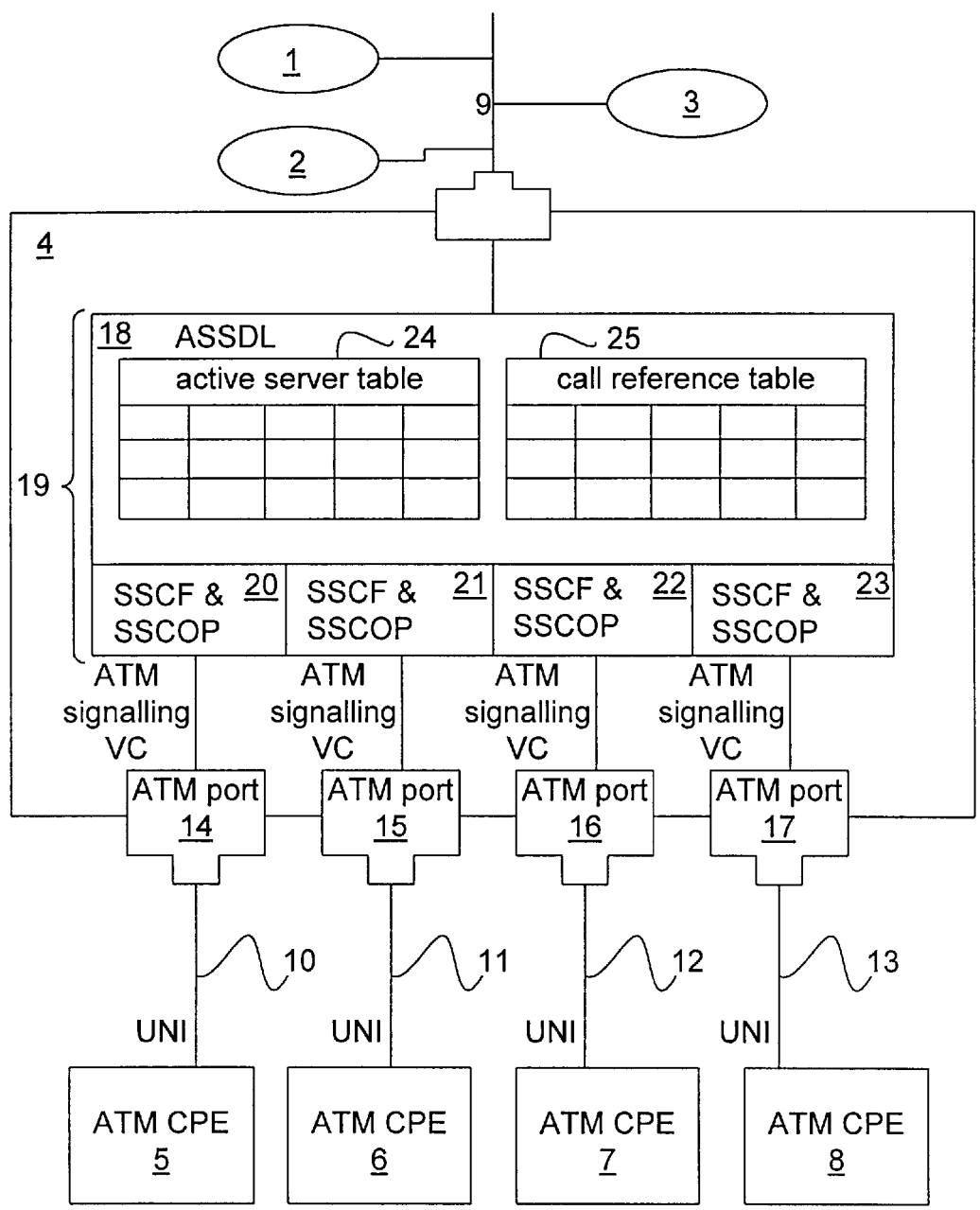
FIG. 1 illustrates the hardware on an Asynchronous Transfer Mode (ATM) node that processes signaling messages according to an embodiment of this invention.

FIG. 1 illustrates an Asynchronous Transfer Mode (ATM) node comprising a plurality of computing units (CU) 1,2,3 that each can serve as an ATM signaling message processor, a switch element (SE) 4, and a plurality of sites with customer premises equipment (CPE) 5 though 8 which are end-points of switched virtual circuits (SVCs). The CUs 1 through 3 can be any standard workstation programmed to run Q.2931 signaling software. They are used to process ATM signaling messages which enter and leave the node through the SE 4. The SE 4 has a switching fabric (not shown) for interconnecting network links in accordance with the ATM protocol-suite. The SE 4 is connected to all the CUs 1 through 3 through a high-speed link 9 that could be an ATM link or an Ethernet link for example. The CPEs 5 through 8 are connected to the SE 4 by high-bandwidth ATM connections 10 through 13. The ATM User Network Interface (UNI) protocol is implemented across the connections 10 through 13.

FIG. 1 also illustrates the hardware elements within the SE 4 that help implement ATM signaling. These elements include a plurality of ATM ports 14 through 17 that each occupy a card of a slot (it is to be noted that more than one port can occupy a card) leading into the backplane of the SE (cards, slots and backplane not shown). One card/slot combination can support multiple ports. It is to be noted that none of the cards require a local embedded computing system for signaling processing purposes. There also is an ATM Signaling Session Dispatch Logic (ASSDL) 18, which is implemented in a preferred embodiment as an integrated circuit (IC) on a card 19 that also occupies a slot leading into the backplane of the SE 4 (slot and backplane not shown). It is to be noted that the ASSDL 18 need not be implemented as an IC occupying a card—it can be implemented as an ASIC on a regular network card containing ports, or can be implemented as a stand-alone platform that is separate from the SE 4 or the CUs 1 through 3. On the same card 19 as the ASSDL circuit 18 are ICs 20 through 23 that are each connected to a port 14 through 17 respectively. The ICs 20 through 23 implement the Signaling ATM Adaptation Layer (SAAL) protocols required by the Q.2391 signaling protocol—the Service Specific Coordination Function (SSCF) and the Service Specific Connection-Oriented Protocol (SSCOP).

The ASSDL 18 includes an active server table 24 and a call reference table 25. The active server table 24 contains information about the present signaling processing load being handled by each CU 1 through 3. This information can include the sizes of, and the priorities of, the processing loads presently being handled by the CUs 1 through 3. The call reference table 25 maps identifiers of SVC sessions that are currently being supported by the node on one hand, to the CU 1,2 or 3 that is handling each SVC session on the other hand. The identifiers of SVC sessions can be obtained from the call reference field in each Q.2391 PDU, and are hereinafter referred to as call-reference IDs.

It will be noted that the card 19 contains the parts of the SE 4 that exclusively carry out functions related to ATM signaling.

When a request to create an SVC is generated at one of the CPEs, for example the CPE 5, a message carrying the request is sent through the ATM link 10 to the SE 4. At the SE 4, the message is received by the port 14, stripped of its lower layer protocol headers (i.e. headers that implement the physical layer protocols, ATM layer protocols, Common Part ATM Adaptation Layer (CP-AAL) protocols, etc.), and is sent to the card 19 containing the ICs 20 through 23 and the ASSDL 18. At the ICs 20 through 23, the message is further stripped of its SSCOP and SSCF headers, so that only a Q.2391 program data unit (PDU) remains by the time the message reaches the ASSDL 18.

The ASSDL 18 then reads a field within the Q.2391 PDU that contains the call-reference ID for the SVC session. The ASSDL 18 uses the call-reference ID in scanning the call reference table 25 to determine whether or not the SVC being requested is already being supported by one of the node's CUs 1 through 3. If a mapping between the call-reference ID and a given CU is found in the call reference table 25, the requested SVC is already being supported by one of the CUs 1 through 3, and the Q.2391 PDU is dispatched to the supporting CU, as described below.

If no entry in the call-reference table 25 maps the call-reference ID of the requested SVC to one of the CUs 1 through 3, the ASSDL 18 realizes that the newly arrived PDU is carrying a new SVC session setup request. The ASSDL 18 therefore analyses the active server table 24 to select a CU 1,2 or 3 to provide signaling processing for this new SVC session. The ASSDL 18 can use a variety of algorithms to select a CU, depending on what information is held in the active server table 24. A preferred algorithm would select the CU with the most processing capacity available. In a preferred embodiment, the ASSDL 18 selects the CU 1,2 or 3, that is presently supporting the smallest number of SVC sessions. In another preferred embodiment, the CU that has received the smallest number of messages in a recent period of time is selected. It will be obvious to those skilled in the art that several other CU-selection algorithms can be implemented by varying the information held in the active server table 24.

However the selection process takes place, the selected CU, such as the CU 3 for example, will handle all signaling processing on the node for the duration of the SVC session. To ensure the CU 3 receives all messages associated with the given SVC, the ASSDL 18 creates a new entry inside the call reference table 25 that maps the call-reference ID of the new SVC to the selected CU 3. When a subsequent Q.2391 PDU belonging to the same SVC session is received at the SE 4, the ASSDL 18 will once again obtain the call-reference ID from the PDU, as was done when the first PDU associated with this SVC session entered the node. This time however, as a result of the newly made entry into the call reference table 25, the ASSDL 18 will use the call-reference ID to determine that the CU 3 has already been assigned to support the above-mentioned SVC session. The ASSDL 18 will automatically dispatch the PDU to the CU 3.

The CU 3 will thus continue to process signaling messages passing through the SE 4 for the above-mentioned SVC session, until the CPE 5 indicates that the SVC session is ending. When this happens, the entry mapping the CU 3 to the SVC of CPE 5 is removed from the call reference table 25, and the ASSDL 18 will no longer automatically dispatch messages associated with the given SVC session to the CU 3.

It is to be noted that the flow of Q.2391 response-PDUs from the CUs 1 through 3 to the ports 14 through 17, and out over the links 10 through 13, also take place through the ASSDL 18. The ICs 20 through 23, along with other hardware on the SE 4, add on all headers necessary for the signaling message to be sent to other nodes in the network.

It also is to be noted that the ASSDL 18 does not process a Q.2391 PDU, except for identifying the SVC session with which the PDU is associated by reading the call reference ID from the PDU, selecting a CU to process the PDU, and dispatching the PDU to a CU. This means that there is no need to deploy high-performance embedded computing systems for any of the ports 14 through 17. This also means that the ASSDL 18 can operate at a very high speed.

It also is to be noted that no queuing of Q.2391 PDUs takes place in the ASSDL 18 or anywhere else on the SE 4. Any queuing of these PDUs is off-loaded onto the CUs 1 through 3.

In a preferred embodiment, the ASSDL 18 on one hand, and the CUs 1 through 3 on the other hand, use a protocol to exchange information that helps the ASSDL 18 perform more efficiently. It is to be noted, that those skilled in the art will realize it is possible to implement the aforementioned architecture and methods without establishing such a protocol. The ASSDL 18 for example can read Q.2391 PDUs to decide whether or not SVCs are going to be created or released, and thus update the call reference table 25 without receiving information from any of the CUs 1 through 3. The ASSDL 18 can also use several dispatch algorithms, such as round-robin algorithms, that do not require information from the CUs 1 through 3. The use of a protocol between the CU 1 through 3 and the ASSDL 18 is nonetheless desirable, if the following objectives are to be achieved:

(1) Better link integrity between the ASSDL 18 and the CUs 1 through 3, that decreases the probability that a Q.2391 PDU will not be incorrectly handled; and, (2) Richer information exchange between the CUs 1 through 3 and the ASSDL 18, that allows for more sophisticated CU-dispatch algorithms to be used.

A protocol between the ASSDL 18 and the CUs 1 through 3, hereinafter referred to as the ASSDL protocol, is thus implemented in a preferred embodiment.

Figure 2:
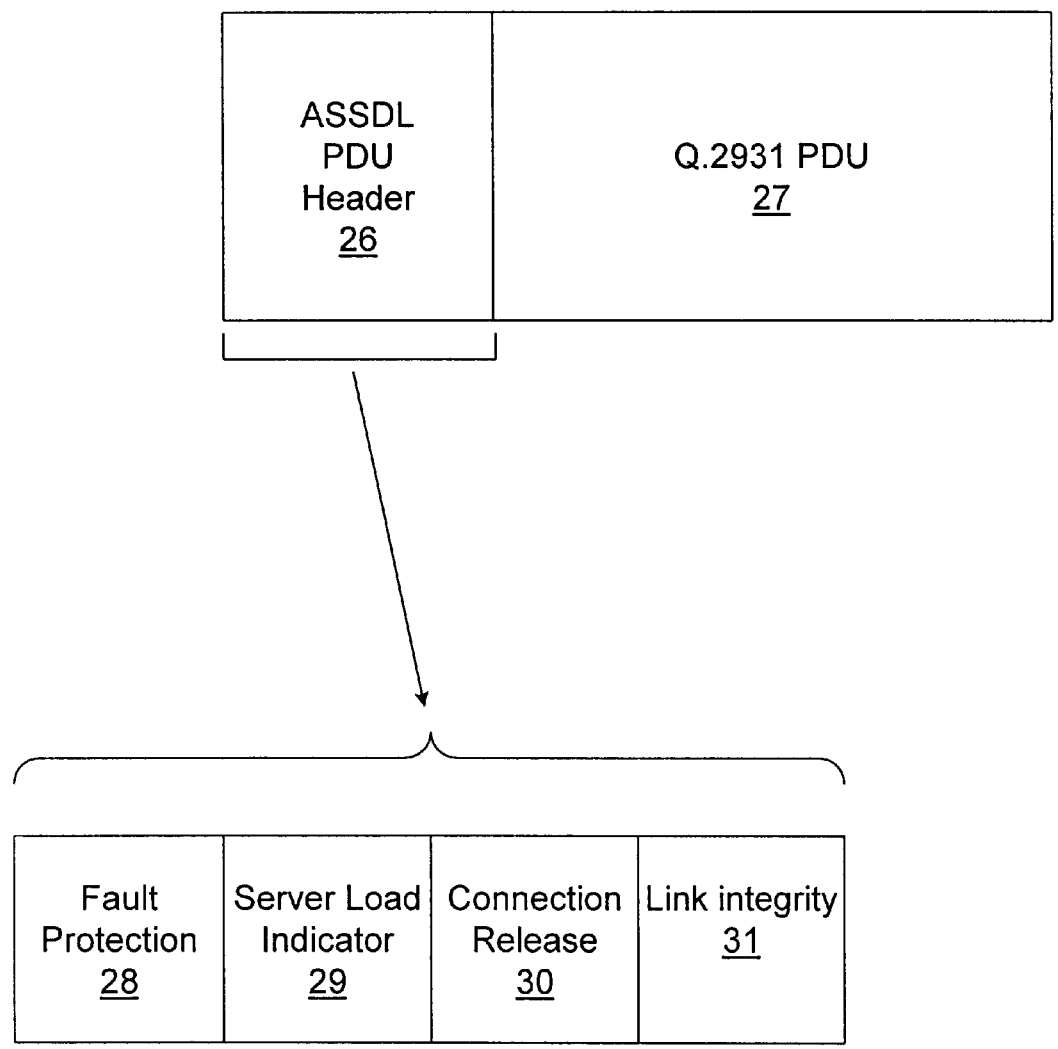
FIG. 2 illustrates a header that is added to a Q.2391 PDU.

FIG. 2 illustrates a header 26 that is added to a Q.2391 PDU 27 in order to implement the ASSDL protocol. The ASSDL header 26, which is attached to each Q.2391 PDU 27 flowing between the ASSDL 18 and the CUs 1 through 3, carries the information required to implement the ASSDL protocol. In a preferred embodiment, the ASSDL header 26 comprises a fault protection field 28, a server load indicator field 29, a connection release field 30 and a link integrity field 31.

The fault-protection field 28 is used to guarantee better link integrity between the ASSDL 18 and the CUs 1 through 3. The CUs 1 through 3 insert heart-beat messages into the fault protection field 28 of each PDU they send to the ASSDL 18. According to the ASSDL protocol, if the ASSDL 18 cannot receive the heart-beat message from a CU before a heart-beat time-out expires, the ASSDL 18 will assume that the CU has malfunctioned and initiates fault-protection fall-back procedures to assign another CU to serve the SVCs being supported by the faulty CU. In such an event, the affected CU is also marked within the active server table 24 as being inoperative, so as to prevent new SVCs from attempting to rely on the CU for signaling processing services. No new signaling messages are forwarded to the affected CU until it successfully sends heart-beat messages to the ASSDL 18. When this occurs, the affected CU is marked within the active server table 24 as being operative.

The server load indication field 29 is used to allow a greater variety of more sophisticated Q.2391 dispatch algorithms to be implemented. More specifically, the field 29 is filled by the CUs 1 through 3, and then read by the ASSDL 18 to update the entries inside the active server table 24 that contain CU-status information. As mentioned previously, this information is used by the ASSDL 18 to decide which CU 1,2 or 3 will be assigned signaling processing responsibilities for newly supported SVC sessions. The information placed in this field thus defines which CU-selection algorithms can be used. If the ASSDL 18 selects the least loaded CU to support a new SVC session for example, the server load indication field 29 must indicate the size of the processing loads of each CU. It the ASSDL 18 selects the CU that has had the least signaling traffic in a recent period of time to support a new SVC session, the server load indication field 29 must indicate the number of messages recently handled by each CU.

The connection release field 30 is used to guarantee better link integrity between the ASSDL 18 and the CUs 1 through 3. It is filled by CUs 1 through 3 once the Q.2391 signaling software receives a Q.2391 Release message and decides to terminate a given SVC session. When such a message is placed in the connection release field 30, the ASSDL 18 will remove from the call reference table 25 the entry mapping the given SVC session to one of the CUs 1 through 3. This feature of the ASSDL protocol is invaluable when, for example, an incoming message indicates that a request to release the SVC has been made, but the Q.2391 software on the CU serving the SVC session will eventually turn down the request. If the ASSDL 18 only associates and disassociates an SVC from its CU using the connection release field 30, and thus only releases SVCs when instructed to do so by the Q.2391 signaling software on the CUs 1 through 3, this situation will not lead to the ASSDL 18 incorrectly removing an entry from the call reference table 25. If on the other hand, the ASSDL 18 disassociates an SVC from its CU whenever it handles a Q.2391 PDU 27 containing a request to release the SVC, entries will be mistakenly removed the call reference table 25 in such situations.

The link integrity field 31 also guarantees better link integrity between the ASSDL 18 and the CUs 1 through 3. In a preferred embodiment, the link integrity field 31 can be filled with a count of the number of Q.2391 PDUs that have already been received or sent by either the ASSDL 18 or the CUs 1 through 3, in supporting a given SVC session. By allowing the ASSDL 18 and the CUs 1 through 3 to share this information with each other, the ASSDL protocol gives them the opportunity to compare the number of PDUs each believes has been processed for a given SVC session. This comparison, in turn, can lead to the detection of communication errors such as missing PDUs, and thus trigger the timely invocation of error re-transmission services.

It is to be noted that the signaling processing methods that are performed using the architecture of FIG. 1 and the above described ASSDL protocol, collectively have several advantages over signaling processing methods available to prior art one-processor-per-card and one-processor-per-node architectures. Processing power, and the ability to support a greater number of SVC sessions, can be gracefully added to each node by simply adding more CUs to a given SE. ATM signaling messages can be processed more rapidly than even in the one-processor-per-card architecture, since excessive traffic through a single port can be dynamically load-shared between several CUs under the architecture of FIG. 1, rather than being rammed through a card's single processor.

Furthermore, by not requiring high-performance embedded computing systems on each card of the node, the signaling processing method described above reduces the costs of port cards and of software upgrade and support, relative to the costs generated by the methods available under the one-processor-per-card architecture. Upgrade and support costs are reduced because the CUs do not need to be embedded in cards and thus can be implemented by widely supported industry-standard workstation technology.

Finally, the architecture described above, when used in conjunction with the ASSDL protocol, allows for greater fault-tolerance and more sophisticated signaling dispatch algorithms, by providing dynamic control over computing-system-to-SVC mappings.

It will be appreciated by those skilled in the art that numerous other modifications and variations of the above-described architecture and methods are possible. The methods and architectures described above can be applied to any node that forms part of an SVC, and is not restricted to nodes that provide UNI interfaces for CPEs.

The contents of the active server table 24, the call reference table 25 and the fields of the ASSDL header 26 can be varied to contain slightly different information.

Figure 3:
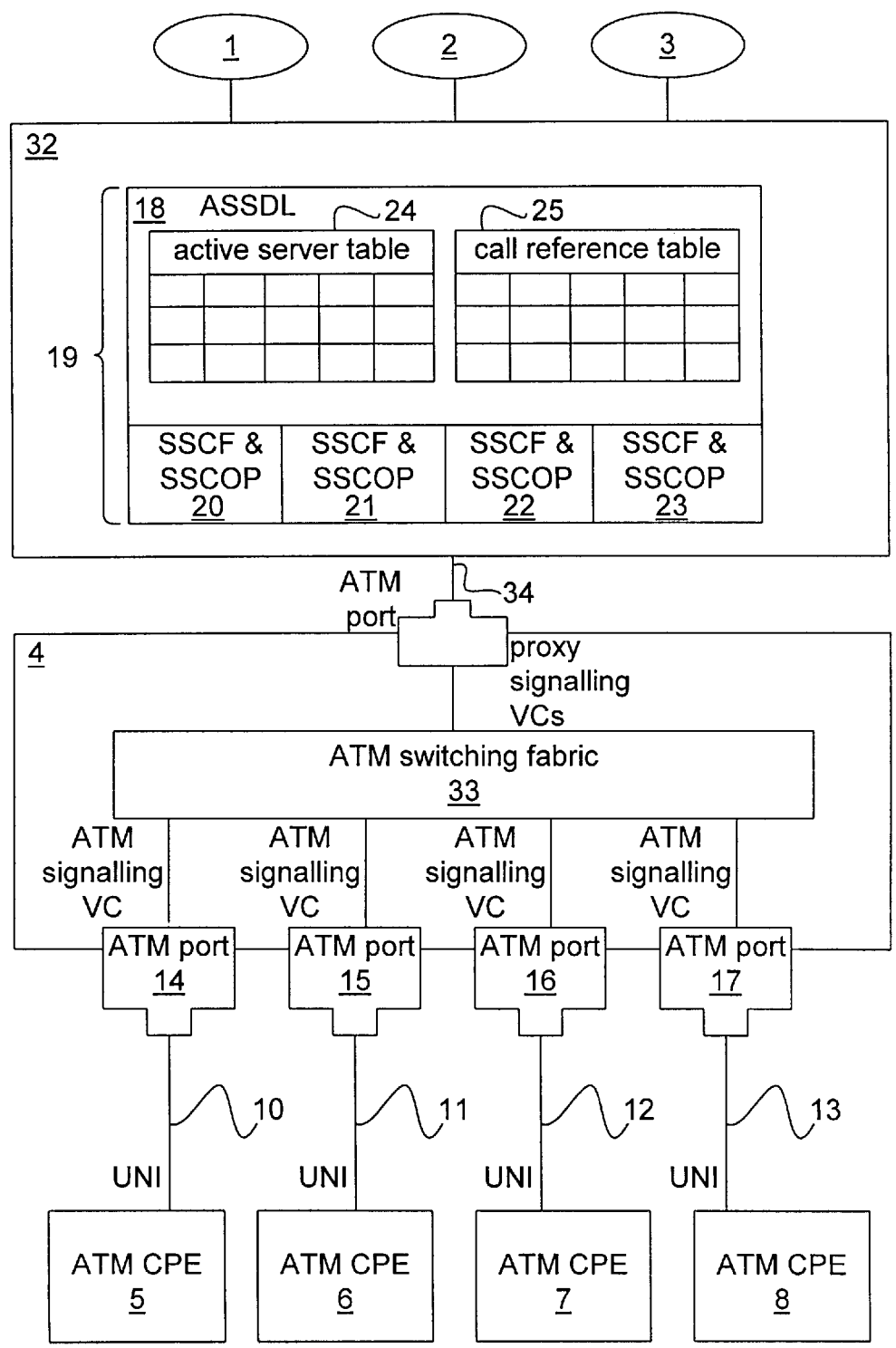
FIG. 3 illustrates the hardware on an Asynchronous Transfer Mode (ATM) node that processes signaling messages according to another embodiment of this invention

A further variation is possible as shown in FIG. 3, which illustrates a modified version of the ATM node of FIG. 1. The only major difference between the nodes of FIG. 1 and FIG. 3 is that parts inside the card 19 of FIG. 1, which as mentioned before comprise the parts of the SE 4 that carry out functions related to ATM signaling, are moved off the SE 4 and onto an external platform 32. According to this embodiment, signaling messages coming from the CPEs 5 though 8, are automatically routed across a switching fabric 33 of the SE (present but not shown on the node of FIG. 1) and a high-speed ATM link 34, to the platform 32. At the platform, the ICs 20 through 23 and the ASSDL 18 deal with the signaling messages in substantially the same manner as described above.

It also is possible to install the components inside the card 19 of FIG. 1 onto another CU, such as one of the CUs 1,2 or 3.

We claim:

1. In an Asynchronous Transfer Mode (ATM) node that comprises a switch element (SE) for switching traffic between ATM links and a plurality of computing units (CUs) connected to the SE for performing software control functions, a method of processing an ATM signaling message that is associated with a given Switched Virtual Circuit (SVC) session and conforms with a given signaling protocol, said method comprising the steps of:

a port on the SE receiving the signaling message from ATM links;

a message header processing means receiving the signaling message and stripping it of headers used by protocols other than the signaling protocol;

an ATM signal session dispatch logic (ASSDL) selecting one of the CUs to process the message on a per-SVC session basis;

the ASSDL forwarding the message to the selected CU for processing; and the selected CU processing the message and sending any necessary signaling messages in response out over a network link through the ASSDL and the SE, which add the necessary headers to the outgoing messages.

2. The method of claim 1 wherein the step of the ASSDL selecting one of the CUs to process the message, comprises the steps of selecting any CU that is already supporting the given SVC, and if no such CU exists, selecting the CU with the most available processing capacity.

3. The method of claim 2 wherein the CU with the most available processing capacity is deemed to be the CU that is presently supporting the least number of SVC sessions.

4. The method of claim 2 wherein the CU with the most available processing capacity is deemed to be the CU that has received the least number of signaling messages over a recent period of time.

5. The method of claim 1 wherein the step of the ASSDL forwarding the message to the selected CU, and the step of the selected CU processing the message and sending any necessary signaling messages in response, are carried out in accordance with a protocol that allows the selected CU and the ASSDL to exchange control information.

6. The method of claim 5 wherein the protocol supports the transmission of heart-beat messages from the selected CU that allow the ASSDL to know whether or not the CU is available for processing signaling messages.

7. The method of claim 5 wherein the protocol supports the transmission of server-load indication messages from the selected CU that help the ASSDL select one of the CUs to process messages for new SVC sessions.

8. The method of claim 7 wherein the server-load indication messages indicate the number of SVC sessions being supported by the selected CU.

9. The method of claim 7 wherein the server-load indication messages indicate the number of signaling messages processed by the selected CU over a recent period of time.

10. The method of claim 5 wherein the protocol supports the transmission of connection release messages from the CU that indicate to the ASSDL when an SVC session is terminating.

11. The method of claim 5 wherein the protocol supports the transmission of link integrity messages between the selected CU and the ASSDL that help both determine whether all the messages belonging in the given SVC session have been exchanged between the CU and the ASSDL in their proper sequence.

12. The method of claim 11 wherein the originator of a link-integrity message specifies the number of signaling messages related to the given SVC session that it has received, since the SVC session started.

13. The method of claim 5 wherein the protocol supports the transmission of heart-beat messages from the selected CU that allow the ASSDL to know whether or not the CU is available for processing signaling messages, of server-load indication messages from the selected CU that help the ASSDL select one of the CUs to process messages for new SVC sessions, of connection release messages from the CU that indicate to the ASSDL when an SVC session is terminating, and of link integrity messages between the selected CU and the ASSDL that help both determine whether all the messages belonging in the given SVC session have been exchanged between the CU and the ASSDL in their proper sequence.

14. The method of claim 5 wherein information related to the protocol is exchanged by the ASSDL and the selected CU using headers attached to the signaling messages.

15. The method of claim 5 wherein the implementation of the protocol relies on the services provided by an underlying ATM suite of protocols.

16. The method of claim 5 wherein the implementation of the protocol relies on the services provided by an underlying ethernet suite of protocols.

17. The method of claim 1 wherein the step of the message header processing means receiving the signaling message and stripping it of headers used by protocols other than the signaling protocol, includes the step of stripping the Service Specific Coordination Function (SSCF) and the Service Specific Connection-Oriented Protocol (SSCOP) headers, so as to leave from the signaling message only a Q.2391 program data unit (PDU) for processing.

18. An Asynchronous Transfer Mode (ATM) node comprising a switch element (SE) containing ports and a switching fabric for switching traffic between ATM links, a plurality of computing units(CUs) for performing software control functions that is connected to the SE through ATM links, and means for dispatching signaling messages to the CUs such that the signaling messages are processed on the CUs, wherein the means for dispatching signaling messages comprises means for implementing the services associated with the Service Specific Coordination Function (SSCF) and the Service Specific Connection-Oriented Protocol (SSCOP), and an ATM signaling session dispatch logic (ASSOL) for dispatching Q.2391 PDUs to the CUs, wherein the ASSDL includes an active server table that contains information about the present signaling processing load being handled by each Cu, and a call reference table that maps switched virtual circuit (SVC) sessions that are currently being supported by the node to the CU that is processing signaling messages for the SVC session.

19. The node of claim 18 wherein the ASSDL is implemented as an integrated circuit (IC).

20. The node of claim 18 wherein the means for implementing the services associated with the Service Specific Coordination Function (SSCF) and the Service Specific Connection-Oriented Protocol (SSCOP) are implemented as at least one integrated circuit (IC).

21. An Asynchronous Transfer Mode (ATM) switch element (SE) containing ports and a switching fabric for switching traffic between ATM links, and means for dispatching signaling messages to computing units (CUs) such that the signaling messages are processed on the CUs, wherein the means for dispatching signaling messages comprises means for implementing the services associated with the Service Specific Coordination Function (SSCF) and the Service Specific Connection-Oriented Protocol (SSCOP), and an ATM signaling session dispatch logic (ASSDL) for dispatching Q.2391 PDUs to the CUs, wherein the ASSDL includes an active server table that contains information about the present signaling processing load being handled by each CU, and a call reference table that maps switched virtual circuit (SVC) sessions that are currently being supported by the node to the CU that is processing signaling messages for the SVC session.

22. In an ATM node, a card for dispatching signaling messages from an ATM switching element (SE) to computing units (CUs) such that the signaling messages are processed on the CUs, said card comprising means for implementing the services associated with the Service Specific Coordination Function (SSCF) and the Service Specific Connection-Oriented Protocol (SSCOP), and an ATM signaling session dispatch logic (ASSDL) for dispatching Q.2391 PDUs to the CUs, wherein the ASSDL includes an active server table that contains information about the present signaling processing load being handled by each CU, and a call reference table that maps switched virtual circuit (SVC) sessions that are currently being supported by the node to the CU that is processing signaling messages for the SVC session.

23. The card of claim 22 deployed in a slot of the SE.

24. The card of claim 22 deployed on a stand-alone platform connected to the SE and the Cus.

* * * * *